(12) United States Patent
Hostmark et al.

(10) Patent No.: US 12,529,441 B2
(45) Date of Patent: Jan. 20, 2026

(54) PIG DRIVE, PIG DRIVE SYSTEM AND METHOD OF USING SAME

(71) Applicant: NOV Process & Flow Technologies AS, Fornebu (NO)

(72) Inventors: Rune Hostmark, Oslo (NO); Christian Holberg, Oslo (NO); Morten Martinsen, Sofiemyr (NO)

(73) Assignee: GRANT PRIDECO, INC., Wilmington, DE (US)

( * ) Notice: Subject to any disclaimer, the term of this patent is extended or adjusted under 35 U.S.C. 154(b) by 356 days.

(21) Appl. No.: 17/086,874

(22) Filed: Nov. 2, 2020

(65) Prior Publication Data

US 2021/0172559 A1 Jun. 10, 2021

(30) Foreign Application Priority Data

Dec. 6, 2019 (EP) .................................. 19214214

(51) Int. Cl.
*F16L 55/46* (2006.01)
*B08B 9/055* (2006.01)

(52) U.S. Cl.
CPC ............ *F16L 55/46* (2013.01); *B08B 9/0551* (2013.01)

(58) Field of Classification Search
CPC .... B08B 9/0551; E21B 37/02; F16L 2101/12; F16L 2101/30; F16L 55/46
See application file for complete search history.

(56) References Cited

U.S. PATENT DOCUMENTS 3,611,467 A * 10/1971 Hinz ................. F16L 55/46
15/104.061
4,385,640 A * 5/1983 Iverson ............... G05D 7/0133
417/299
2015/0108246 A1 * 4/2015 Stucchi ............. F02M 51/0603
239/585.5
2016/0091115 A1 3/2016 Fretwell
2017/0219043 A1 * 8/2017 Firek ..................... B60G 13/08

FOREIGN PATENT DOCUMENTS

| CA | 2196965 | | 8/1998 | |
|----|---------|---|--------|---|
| CA | 2196965 | C * | 6/1999 | |
| DE | 4010855 | A1 * | 10/1991 | |
| FR | 2769250 | A1 * | 4/1999 | ........... B08B 9/0557 |
| GB | 2570724 | | 8/2019 | |
| WO | 2012/058551 | A2 | 5/2012 | |
| WO | 2012/058551 | A3 | 5/2012 | |

OTHER PUBLICATIONS

Machine translation of DE4010855A1 (Year: 1991).*
Machine translation of FR2769250A1 (Year: 1999).*
Extended European Search Report issued May 11, 2020 in European Application No. 19214214.9.

* cited by examiner

*Primary Examiner* — Douglas Lee

(74) *Attorney, Agent, or Firm* — Wenderoth, Lind & Ponack, L.L.P.

(57) ABSTRACT

A pig drive, a pig drive system for feeding a pig into a pig kicker section of a pipe, and a method for feeding the pig into the pig kicker section of the pipe are disclosed. The pig drive includes: a piston with a radial direction and an axial direction; a rod connected to the piston and extending in the axial direction of the piston, wherein the rod has a distal end adapted to interface the pig; a retainer slidably connected to the rod and adapted to interface a retainer abutment; and a biasing device arranged to bias the retainer towards the distal end of the rod.

13 Claims, 8 Drawing Sheets

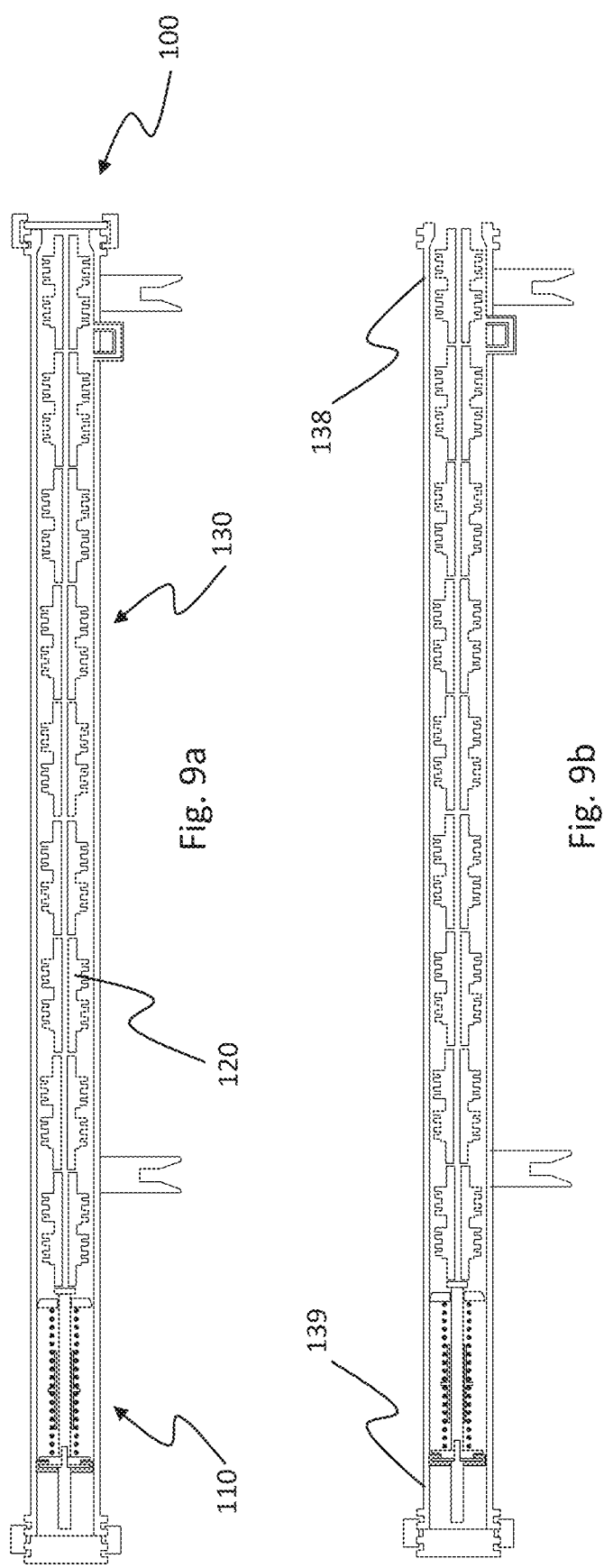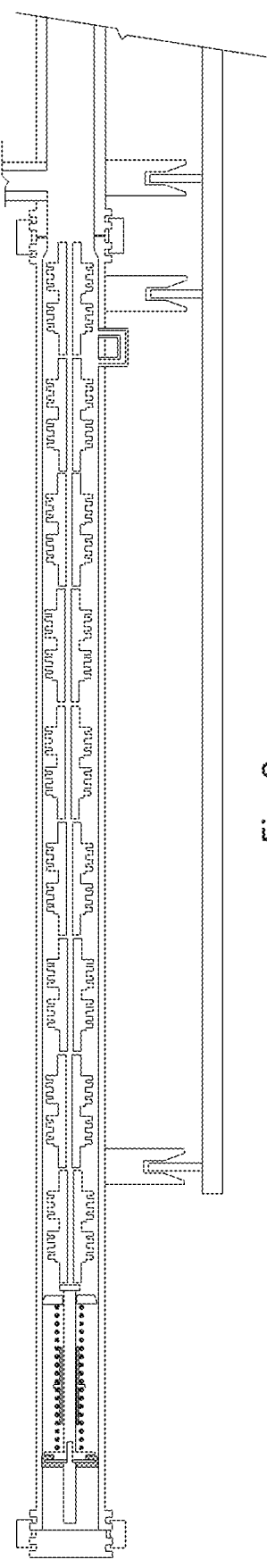

PIG DRIVE, PIG DRIVE SYSTEM AND METHOD OF USING SAME

TECHNICAL FIELD

The present invention relates to pigging of pipes, in particular a pig drive and a pig drive system for feeding a pig into a pipe.

BACKGROUND

Related to production and transportation of hydrocarbons, there is extensive use of pipes, both for unprocessed well stream (in the following referred to as flow lines), and for sales quality fluids (in the following referred to as trunk lines). For flow lines there may be a need for frequent pigging or removal of wax and liquid slugs. A purpose designed device, referred to as Pipeline Inspection Gauge (PIG), is pushed through the flowline or trunk line by the well stream or production fluid to clean out wax or slugs.

A pig may be any movable pipe tool which e.g. can be used for physical separation of fluids in a pipeline, internal cleaning of pipelines, inspection of pipelines, and recording geometric information of pipelines.

To run a pig into a pipe or pipeline, a subsea automated pig launcher (SAPL) is typically used. Such pig launchers comprise a kicker unit, a SAPL main unit and a running frame. The running frame is used to deploy and replace pig cassettes and is therefore temporarily installed subsea. The kicker unit and the SAPL main unit are permanently installed.

The kicker unit has: a first inlet connected to a flowline, riser, pipe, pipeline or similar; an outlet connected to a flowline, riser, pipe, pipeline or similar; and a second inlet connected to the SAPL main unit. Furthermore, the kicker unit has valves and flow loops providing and preventing fluid communication between the inlets and outlet. If a pig is fed into the kicker unit via the second inlet, connected to the SAPL main unit, the pigging can be initiated by operating the valves of the kicker such that the fluid flow entering the kicker unit through the first inlet forces the pig out through the outlet of the kicker unit.

The SAPL main unit comprises a pipe that is connected to the kicker unit in a first end and connectable to the running frame in a second end.

The running frame is used to transport a pig cassette from topside to the SAPL main unit and then to stroke the pig cassette into the pipe of the SAPL main unit. The pig cassette contains a train of pigs and a pig drive. From the pig cassette located inside the pipe of the SAPL main unit, the pig drive feeds the pigs into the kicker unit by means of a fluid pressure.

When all pigs have been fed into the kicker unit, the pig drive remains in the pig cassette. The pig cassette can then be pulled out of the SAPL main unit by means of the running frame and retrieved to topside where it can be reloaded with pigs.

The pig drive has a nose interfacing the last pig to be fed into the kicker unit. The nose ensures the last pig is fed sufficiently far into the kicker unit. After feeding the last pig, the pig drive protrudes outside the pig cassette.

Pig launcher systems comprising a kicker unit, a SAPL main unit and a running frame has a significant footprint.

Significant costs are associated with the production and installation of each of the three above-mentioned subsea units.

The present invention is directed to a leaner pig launcher system and pig drive than the above-described and a method for using same. A leaner design reduces the number of units such that the footprint can be reduced, pig capacity increased, cost saved, operational robustness improved, and transportation simplified.

SUMMARY OF THE INVENTION

The invention provides a device, a system and a method for feeding a pig into a pig kicker section of a pipe as set forth herein.

It is disclosed a pig drive for feeding a pig into a pig kicker section of a pipe, wherein the pig drive comprises: a piston with a radial direction and an axial direction; a rod connected to the piston and extending in the axial direction of the piston, wherein the rod has a distal end adapted to interface a pig; a retainer slidably connected to the rod and adapted to interface a retainer abutment; and a biasing device arranged to bias the retainer towards the distal end of the rod.

It is achieved a pig drive with an extended state and a retracted state. The pig drive is operated towards the extended state when the retainer is retained and the piston is applied a force, by means of a fluid pressure, exceeding a biasing force of the biasing device. The pig is automatically operated back to the retracted state when the applied force on the piston, by means of a fluid pressure, goes below the biasing force of the biasing device.

The extended and retracted states of the pig drive enable the rod to temporarily extend a given length beyond the retainer. In this way the pig drive may temporarily extend outside e.g. a pig cassette. This given length of extension may be adapted to displace the last pig from a pig cassette into a kicker line of a pipe.

An advantage of this pig is that it, in the extended state, may displace the last pig from a pig cassette into a kicker line of a pipe and, in the retracted state, not obstruct the disconnection and retrieval of the pig cassette.

The biasing device stores energy in response to a translation of the retainer towards the piston. This energy is released in response to a translation of the retainer towards a distal end of the rod, i.e. away from the piston. The biasing device may be a damper, a compression spring, a tension spring, a sleeve made of a resilient material such as rubber, or any combinations thereof. The pig drive may comprise a plurality of biasing devices.

The rod and piston may be produced out of one piece or the rod and piston may be produced out of several pieces.

The pipe may be a tube, a pipeline, a conduit or any other pressure housing suitable for conveying a pig.

The biasing device in the form of a spring or sleeve may be arranged around the rod, i.e. concentric with the rod. A biasing device arranged in this manner doesn't require attaching to the piston or the retainer.

The biasing device in the form of a spring or sleeve may be arranged between the piston and the retainer or between the retainer and the distal end of the rod.

The retainer is not adapted to seal; however, it may comprise at least one through hole for pressure equalization.

The pig drive may further comprise a spacer, wherein the spacer is: arranged around the rod and between the piston and the retainer, and/or adapted to ensure a given minimum distance between the piston and the retainer.

The spacer may be adapted to ensure a given minimum distance between the piston and the retainer by means of its axial length, wherein the axial extension of the spacer corresponds to the minimum distance between the piston and the retainer.

The distal end of the rod comprises a perpendicularly protruding portion limiting a maximum distance between the retainer and the piston.

The perpendicularly protruding portion prevents the retainer and/or the biasing device from sliding off the rod.

When the biasing device is arranged between the piston and the retainer, the perpendicularly protruding portion enables the biasing device to apply a force on the piston in the retracted state of the pig drive. The force applied on the piston in the retracted state of the pig drive depends inter alia on the axial extension of the biasing device relative to the axial extension of the rod. The skilled person would know how to manipulate this biasing force.

It is disclosed a pig drive system for feeding a pig into a pig kicker section of a pipe, wherein the pig drive system comprises: a pig drive according to the above disclosure, wherein a translation of the retainer towards the distal end of the rod operates the pig drive towards a retracted state; and wherein the translation of the retainer towards the piston operates the pig drive towards an extended state; at least one pig; and a cylinder adapted to house the pig drive and the at least one pig, wherein the cylinder comprises: a first end portion adapted for sealing connection to the pig kicker section of a pipe, a second end portion sealed during operation of the pig drive, and a retainer abutment; wherein the rod is arranged to extend outside the first end portion of the cylinder, when the pig drive is in the extended state and the retainer is in contact with the retainer abutment; wherein the rod is arranged to be within the cylinder when the pig drive is in the retracted state and the retainer is in contact with the retainer abutment.

The cylinder may be any pressure housing suitable for conveying a pig, such as a pig cassette.

The retainer abutment may be any type of inward restriction of the cylinder such as a load shoulder. The retainer abutment can be continuous or intermittent. The retainer abutment and the retainer preferably has mating geometry, e.g. a coned angle.

The bringing of the retainer into contact with the retainer abutment is dampened by means of the biasing device in that the biasing device will store some of the energy. Thus, the retainer is prevented from wedging to the retainer abutment.

It is achieved a pig drive system, i.e. a pig launcher, with a simplified design wherein large portions of the permanently installed main unit of the prior art pig launchers is made superfluous. Instead of connecting the running frame to the main unit and stroking the cylinder from the running frame into the main unit, the disclosed cylinder is adapted to be directly connected to the pipe. Hence, stroking of the cylinder is not required.

It is achieved a pig drive system that has significantly reduced installation and operational failure risk, which is essential for subsea operations.

It is achieved a more compact pig drive system that allows a larger number of pre-loaded pigs, which is more cost efficient and practical than the prior art. Alternatively, the footprint of the system may be reduced.

It is achieved a leaner system with reduced weight and size.

It is achieved a less complicated system providing improved operational robustness.

It is achieved a simplified transportation, loading, handling and installation.

An advantage of this pig drive system is reduced production cost.

A further advantage of this pig drive system is a simplified offshore installation campaign, which in turn reduces cost.

A further advantage of this pig drive system is a simplified offshore operation during deployment, replacement and retrieval of the cylinder, comprising fever steps than the prior art systems in that no stroking of the cylinder is required.

A further advantage is reduced operational failure risk. In cases where the last pig has been fed into the pipe, the automatic operation of the pig drive into the retracted state facilitates the replacement and retrieval of the cylinder in that:

a shorter horizontal movement of the pig drive system is required to go clear of the pipe; and the risk of damaging the seal surface of the pipe during retrieval of the cylinder is reduced.

The cylinder has an axial direction and a radial direction, and may comprise at least one internal groove for equalizing a pressure across the piston; wherein the at least one internal groove: is oriented in the axial direction of the cylinder; extends an axial length of the cylinder greater than an axial extension of the piston; and is arranged to allow the retainer to contact the retainer abutment and the pig drive to enter the extended state.

When the piston reaches the location of the internal groove, it will no longer seal against the entire inner wall of the cylinder. The fluid pressure will thus be equalized across the piston. The arrangement of the internal groove will therefore define a piston travel termination point.

The distance between the internal groove and the retainer abutment relative to the axial extension of the rod will define the maximum length of the temporary extension of the rod beyond the retainer, and thus also the maximum temporary extension of the rod outside the cylinder.

An advantage of the internal groove is that it contributes to the prevention of the retainer being wedged to the retainer abutment.

When a pressure is equalized across the piston, the retainer may see an increase of pressure. The retainer is not adapted to seal against the retainer abutment. The pressure will therefore also be equalized across the retainer. The equalization across the retainer may be improved by means of the at least one through hole in the retainer. In case of a sudden pressure increase on one side of the retainer, the retainer may be wedged to the retainer abutment. The at least one through hole in the retainer contributes to the prevention of the retainer being wedged to the retainer abutment in case of a sudden pressure increase on one side of the retainer.

The cylinder has an axial direction and a radial direction, and may comprise at least one by-pass conduit for equalizing a pressure across the piston; wherein the at least one by-pass conduit: comprises a first end and a second end, the two ends are connected to and in fluid communication with the cylinder: is arranged with the first end at a position which the piston will pass during operation of the pig drive towards the extended state if the retainer is in contact with the retainer abutment; and is arranged with the second end at a position spaced apart the first end in an axial direction towards the first end portion of the cylinder, wherein the spacing is greater than an axial extension of the piston.

The by-pass conduit is an alternative to the internal groove which also provides the above-mentioned effects and advantages.

A further advantage of the by-pass conduit is that it doesn't compromise the wall thickness of the cylinder. The by-pass conduit can therefore be made to allow a greater volume flow than the internal groove.

The by-pass conduit extends beyond the cylinder wall, while the internal groove doesn't extend beyond the cylinder wall.

The system may further comprise: an operable conduit comprising a first end connected to and in fluid communication with the first end portion of the cylinder and a second end connected to and in fluid communication with the second end portion of the cylinder; a valve arranged in the operable conduit, for control of equalization of a fluid pressure across the piston; wherein the pig drive is arranged closer to the second end portion of the cylinder than the pig, and with the retainer facing the retainer abutment.

The operable conduit may serve the same purpose as the by-pass conduit. However, the operable conduit can be closed by means of the valve, and thus not equalize a pressure across the piston at all. Because of the valve, the connection points of the ends of the operable conduit can be positioned such that a pressure equalization across the piston will occur regardless of the piston position whenever the valve is opened. Such connection points of the ends of the operable conduit may be at the first and second end portions of the cylinder.

The operable conduit may have a plurality of ends connected to and in fluid connection with the cylinder. The operable conduit may be provided with valves arranged between each end or between selected ends. The plurality of ends may be distributed across the entire axial extension of the cylinder.

The system may further comprise a distance piece arranged to provide a volume between the piston and a termination of the second end portion of the cylinder.

The distance piece may be part of or connected to the pig drive. The distance piece may be part of or connected to the second end of the cylinder. The distance piece may be formed as a dome, concave, shoulder, protrusion or any other geometry providing a partial gap between the piston and the termination of the second end portion of the cylinder, into which a fluid pressure can be supplied.

The cylinder may further comprise a supply port arranged in the second end portion of the cylinder, for supply of a fluid pressure on the piston.

The supply port may preferably be a supply port adapted for subsea connection, such as a hotstab receptacle.

It is disclosed a method of feeding a pig into a pig kicker section of a pipe using a pig drive system as described above. Wherein the method comprises the steps of arranging the pig drive and the at least one pig inside the cylinder; connecting the first end portion of the cylinder to the pig kicker section of a pipe; connecting a fluid pressure supply to the supply port; and moving the pig drive towards the pig kicker section of a pipe by means of applying fluid pressure on the piston, such that the movement of the pig drive causes the pig to move into the pig kicker section of a pipe.

The method may further comprise the step of: moving the pig drive until the retainer meets the retainer abutment of the cylinder; operating the pig drive into the extended state by means of applying fluid pressure on the piston, allowing the rod to extend into the pig kicker section of a pipe; operating the pig drive into the retracted state by means of reducing the fluid pressure on the piston, allowing the rod to retract from the pig kicker section of a pipe; disconnecting the fluid pressure supply from the supply port; and disconnecting and recovering the pig drive system.

BRIEF DESCRIPTION OF DRAWINGS

The invention will now be described with reference to the exemplifying non-limiting embodiments shown in the accompanying drawings, wherein:

FIGS. 9a-9c show cross-sections of a pig drive system for feeding a pig into a pig kicker section of a pipe according to an embodiment of the invention, wherein the cylinder is loaded with a plurality of pigs.

DETAILED DESCRIPTION

Figure 1A:
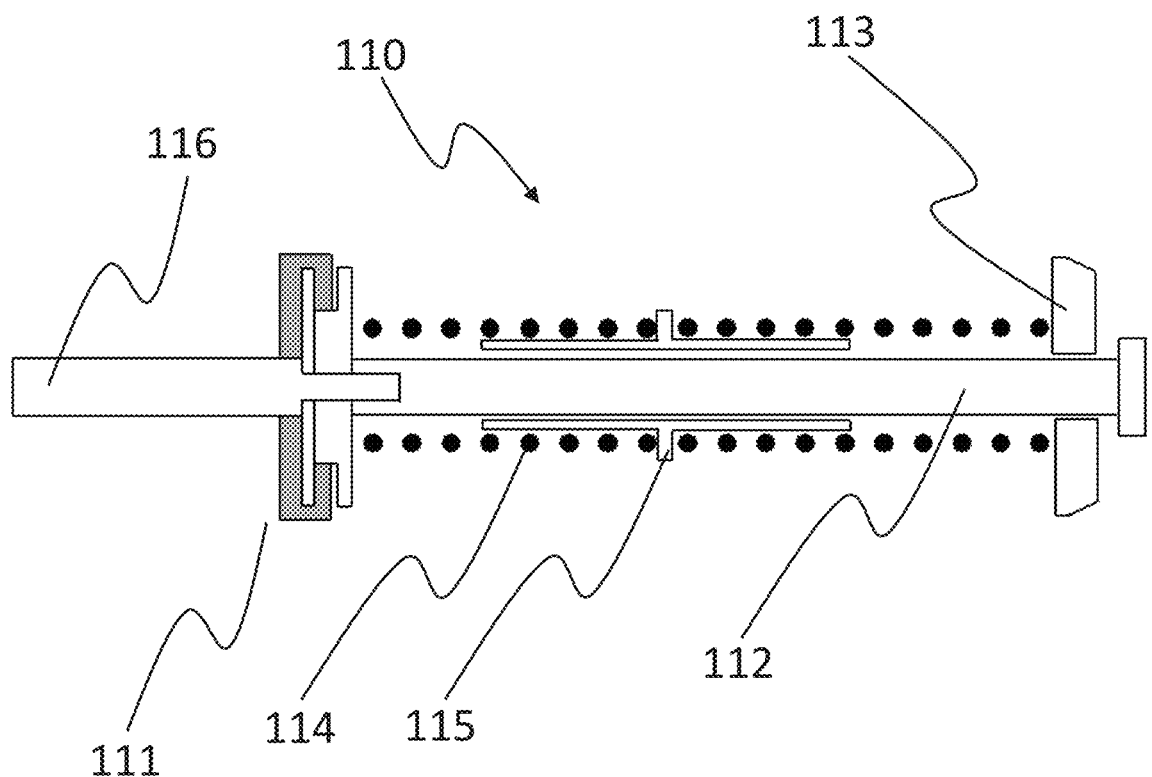
FIG. 1a shows a cross-section of a pig drive for feeding a pig into a pig kicker section of a pipe according to an embodiment of the invention, wherein the pig drive is in a retracted state.

FIG. 1a shows a cross-section of a pig drive 110. The pig drive 110 can be used in a pig drive system 100 where it serves the purpose of feeding a pig 120 into a pig kicker section of a pipe 200. Once the pig 120 is in the kicker section of the pipe 200, it will be launched and pushed through the pipe 200 by means of a fluid flow in the pipe 200.

The pipe 200 is typically permanently installed equipment and may in combination with the pig drive system 100 form a pig launcher.

The pig drive 110 comprises a piston 111, a rod 112, a retainer 113 and a biasing device 114. The pig drive 110 may additionally comprise a spacer 115 and a distance piece 116.

The piston 111 has a radial direction and an axial direction. The piston 111 is adapted to seal against the inside of a cylinder 130 wall and move along a longitudinal direction of the cylinder 130 in response to a differential pressure over the piston 111. Pistons are well known, and the skilled person would know how to adapt the piston 111 to the expected fluid exposure as well as expected temperature and pressure ranges.

The rod 112 has a radial direction and an axial direction. The radial extension of the rod 112 is shorter than the radial extension of the piston 111, and the axial extension of the rod 112 will typically be greater than the axial extension of the piston 111. The rod 112 is connected to the piston 111 and the axial direction of the rod 112 is aligned with the axial direction of the piston 111. When both the piston 111 and the rod 112 have circular cross-sections, the two will typically be concentrically arranged. The rod 112 may terminate at the piston 111 or extend on both sides of the piston 111.

The rod 112 has a distal end pointing away from the piston 111. This distal end of the rod 112 is adapted to interface a pig 120. The distal end of the rod 112 may further comprise a perpendicularly protruding portion.

The retainer 113 has a radial direction and an axial direction. The retainer 113 is slidably connected to the rod 112, typically by means of a central through hole adapted to encircle the circumference of the rod 112. The axial direction of the retainer 113 is aligned with the axial direction of the rod 112. The retainer is not required to seal against the rod 112 or the inside of any cylinder 130. The perpendicularly protruding portion of the rod 112 may serve to prevent the retainer 113 from sliding off the rod 112.

The retainer 113 is adapted to interface a retainer abutment 132 of the cylinder 130. The interface of the retainer 113 may typically be circular and have a chamfered corner of the circumference.

The retainer 113 may comprise at least one through hole for pressure equalization across the retainer 113. The retainer 113 may also have a radial extension dimensioned to provide a gap between the retainer 113 and the wall of the cylinder 130 to prevent a pressure build up on either side of the retainer 113. By providing a small gap between the retainer 113 and the wall of the cylinder 130, the retainer 113 may function as a centralizer, centralizing the pig drive 110 during its movement through the cylinder 130.

The biasing device 114 provides a biasing force. The biasing device 114 is arranged to bias the retainer 113 towards the distal end of the rod 112. The biasing means 114 may be arranged to abut the retainer 113 and the piston 111, as illustrated in FIG. 1a, or alternatively to abut the retainer 113 and the perpendicularly protruding portion of the rod 112.

The biasing device 114 may be a helical compression spring, as illustrated in FIG. 1a, or alternatively a helical tension spring, a resilient sleeve or a hydraulic damper.

If a helical spring is used as the biasing device 114, it can preferably be arranged around the rod 112, as illustrated in FIG. 1a. Arranging the helical spring around the rod 112 will be space efficient and apply the biasing force on the retainer 113 in an evenly distributed manner. A compression spring will typically be arranged to abut the retainer 113 and the piston 111. A tension spring will typically be arranged to abut the retainer 113 and the perpendicularly protruding portion of the rod 112.

If a resilient sleeve is used, it can preferably be arranged around the rod 112, between the piston 111 and the retainer 113.

If one or several hydraulic dampers are used, it/they can be arranged between the piston 111 and the retainer 113, offset the rod 112.

The spacer 115 may be adapted to ensure a given minimum distance between the piston 111 and the retainer 113 by means of its axial extension, wherein the axial extension of the spacer 115 corresponds to the minimum distance between the piston 111 and the retainer 113.

The spacer 115 may be arranged around the rod 112 and between the piston 111 and the retainer 113.

The distance piece 116 may be a part of the rod 112, when the rod 112 extends on both sides of the piston 111.

The pig drive 110 illustrated in FIG. 1a is in a retracted state. When the biasing device 114 is not affected by external forces, the biasing device 114 will operate the pig drive 110 towards the retracted state and/or maintain the pig drive 110 in the retracted state. In the retracted state, the distance between the retainer 113 and the distal end of the rod 112 is typically shorter than the distance between the retainer 113 and the piston 111. When the retainer 113 moves away from the piston 111 and towards the distal end of the rod 112, it is operated towards the retracted state.

Figure 1B:
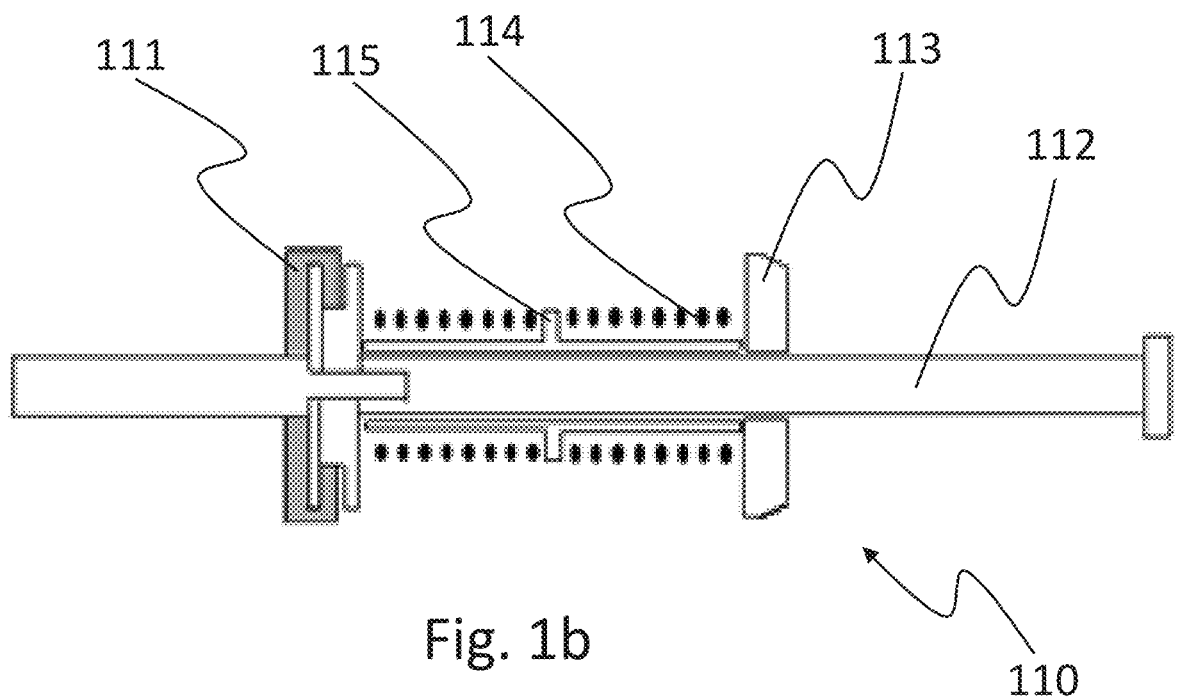
FIG. 1b shows a cross-section of a pig drive for feeding a pig into a pig kicker section of a pipe according to an embodiment of the invention, wherein the pig drive is in an extended state.

FIG. 1b shows a cross-section of the same pig drive 110 as in FIG. 1a. The pig drive 110 illustrated in FIG. 1b is in an extended state. When the biasing device 114 is affected by an external force oppositely directed and exceeding the biasing force of the biasing device 114, the pig drive 110 will be operated towards the extended state and/or maintained in the extended state. In the extended state, the distance between the retainer 113 and the distal end of the rod 112 is not necessarily greater than the distance between the retainer 113 and the piston 111. However, the distance between the retainer 113 and the piston 111 is shorter in the extended state of the pig drive 110 than in the retracted state of the pig drive 110. Accordingly, the distance between the retainer 113 and the distal end of the rod 112 is greater in the extended state of the pig drive 110 than in the retracted state of the pig drive 110. When the retainer 113 moves towards the piston 111 and away from the distal end of the rod 112, it is operated towards the extended state.

As illustrated in FIG. 1a-b, the biasing device 114 may be a compression spring. When a compression spring is compressed until the coils come in contact with each other, then the spring is said to be solid. The solid length of a spring is the product of total number of coils and the diameter of the wire. The free length of a compression spring is the length of the spring in the free or unloaded condition.

If a biasing device 114 in the form of a compression spring is used in combination with a spacer 115, the axial extension of the spacer 115 should be greater than the solid length of the compression spring.

If a biasing device 114 in the form of a compression spring is used, the free length of the compression spring should be equal or greater than the axial extension of the rod 112.

Figure 2A:
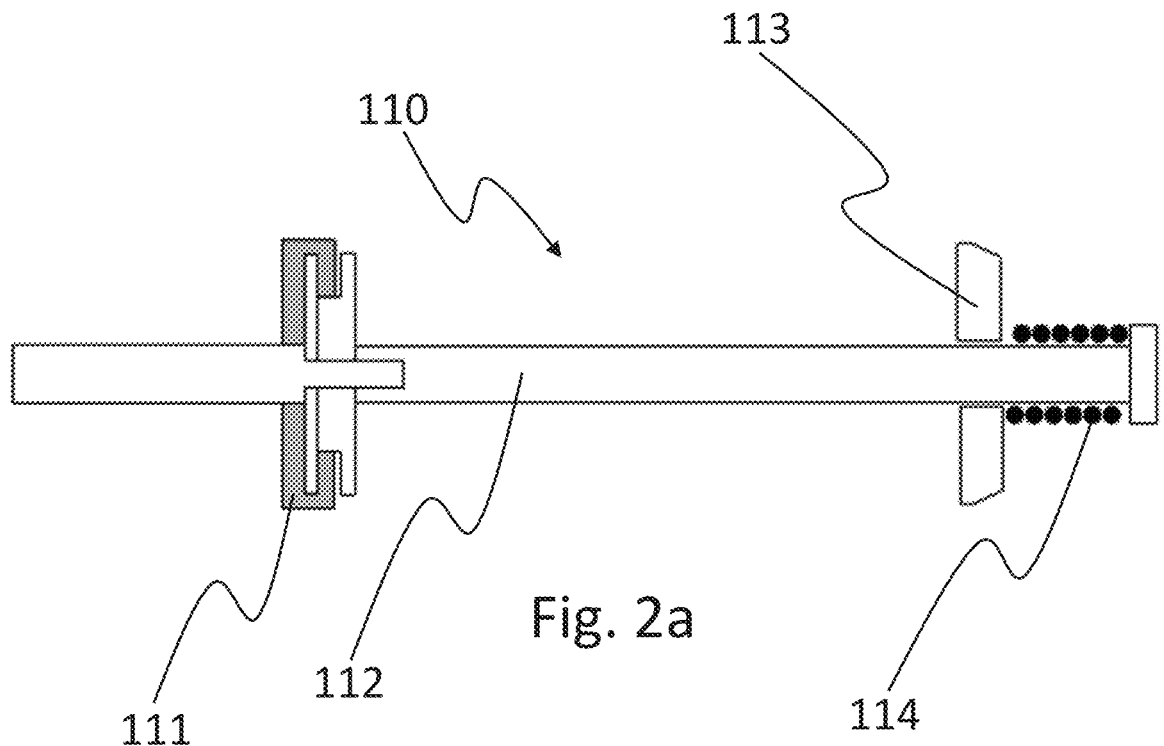
FIG. 2a shows a cross-section of a pig drive for feeding a pig into a pig kicker section of a pipe according to an embodiment of the invention, wherein the pig drive is in a retracted state.

FIG. 2a shows a cross-section of the pig drive 110 in a retracted state. The pig drive of FIG. 2a differs from the pig drive 110 of FIG. 1a in that it has a biasing device 114 in the form of a tension spring. The tension spring is arranged around the rod 112 and between the retainer 113 and the distal end of the rod 112.

The pig drive 110 using a tension spring will have a greater distance between the retainer 113 and the distal end of the rod 112 in its retracted state as compared to the pig drive using a compression spring.

Figure 2B:
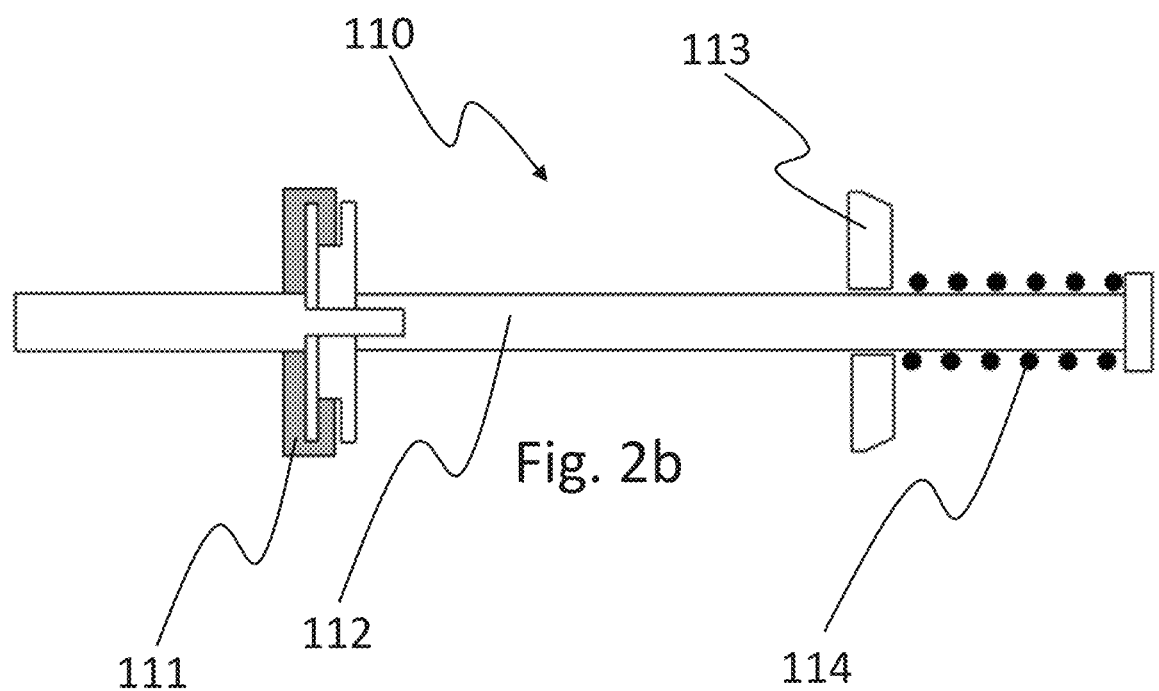
FIG. 2b shows a cross-section of a pig drive for feeding a pig into a pig kicker section of a pipe according to an embodiment of the invention, wherein the pig drive is in an extended state.

FIG. 2b shows a cross-section of the same pig drive 110 as FIG. 2a. The pig drive 110 illustrated in FIG. 2b is in an extended state.

The same principles apply to the retracted and extended state of the pig drive 110 regardless if a compression spring or a tension spring is used.

Figure 3A:
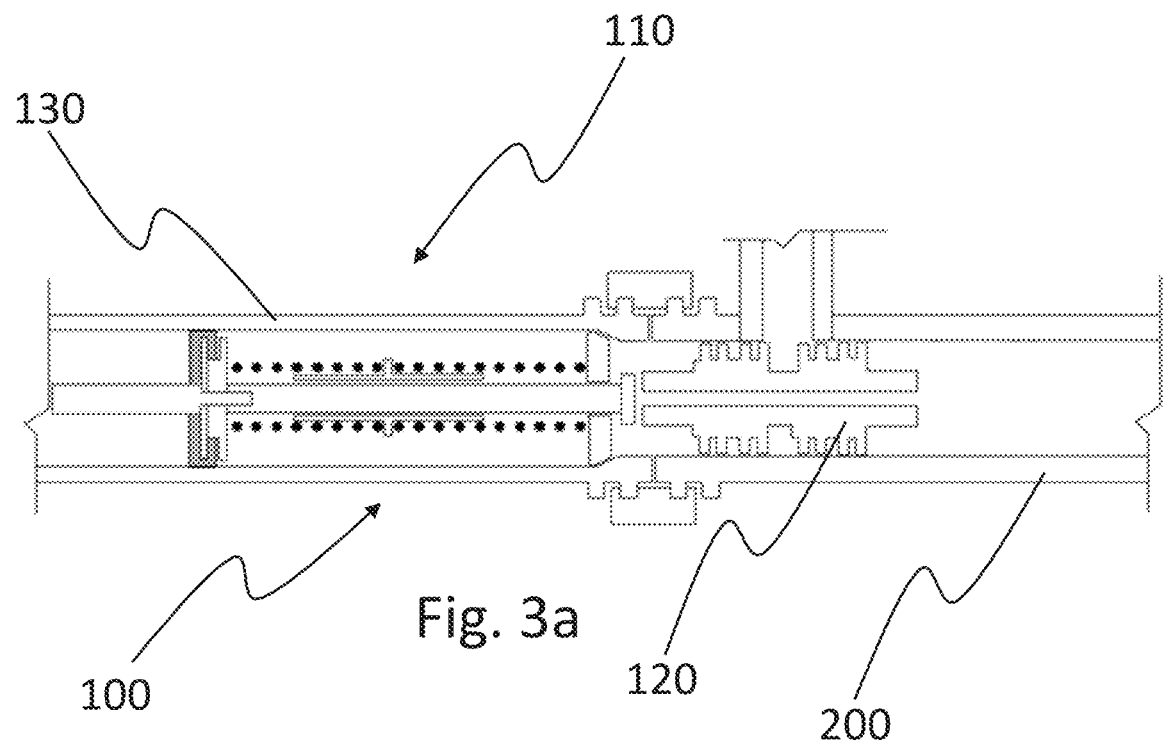
FIG. 3a shows a cross-section of a pig drive system for feeding a pig into a pig kicker section of a pipe according to an embodiment of the invention, wherein the pig drive is in a retracted state.
Figure 3B:
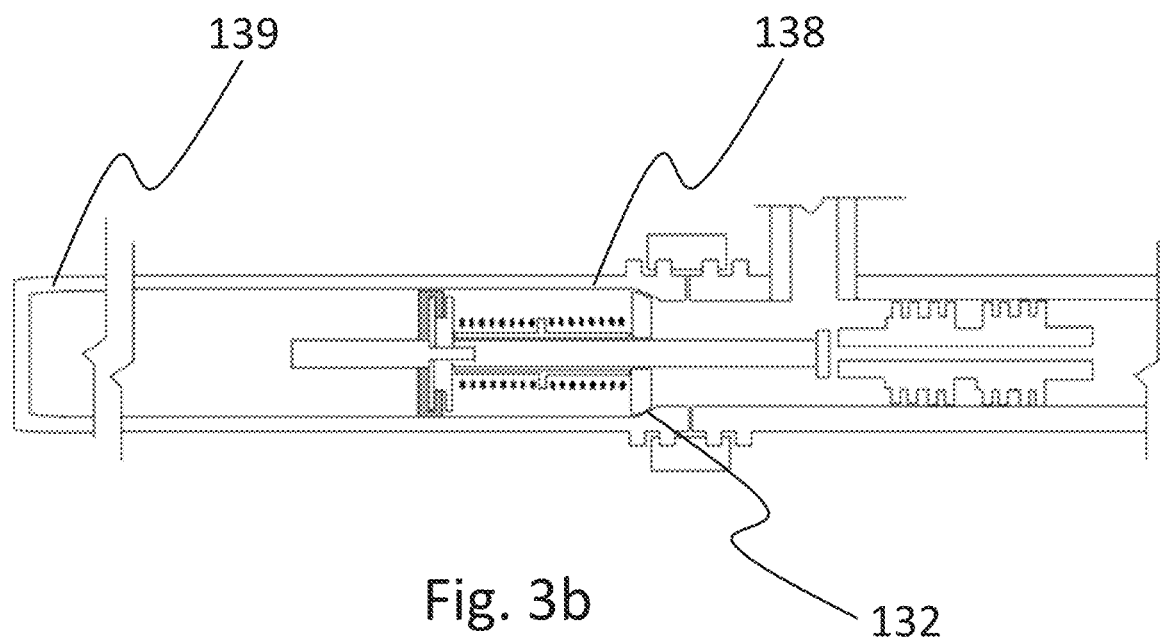
FIG. 3b shows a cross-section of a pig drive system for feeding a pig into a pig kicker section of a pipe according to an embodiment of the invention, wherein the pig drive is in an extended state and the pig is in a pig kicker section of the pipe.

FIGS. 3a and 3b show cross-sections of the same pig drive system 100. The pig drive system 100 can be used in a pig launcher where it serves the purpose of feeding a pig 120 into a pig kicker section of a pipe 200. Once the pig 120 is in the kicker section of the pipe 200, it will be launched and pushed through the pipe 200 by means of a fluid flow in the pipe 200.

The pig drive system 100 comprises a pig drive 110, at least one pig 120 and a cylinder 130.

The pig drive 110 illustrated in FIG. 3a is in the retracted state. The pig drive 110 illustrated in FIG. 3b has be operated towards the extended state. The pig drive 110 used in the pig drive system 100 may be any of the above-described pig drives 110.

The at least one pig 120 used in the pig drive system 100 may be any type of pig 120.

The cylinder 130 is adapted to house the pig drive 110 and the at least on pig 120. The cylinder 130 has radial direction and an axial direction and comprises a first end portion 138 and an opposite second end portion 139.

The first end portion 138 of the cylinder 130 is adapted for sealing connection to the pig kicker section of the pipe 200. This connection may e.g. be a standard tie-in connection using a metal-to-metal seal in combination with a connector. Other types of connections available to the skilled person could also be used. The illustrated cylinder 130 is horizontally connected to the pipe 200. The first end portion 138 may comprise a sealingly connectable cap or at least a protective cap. Such caps may inter alia protect the inside of the cylinder 130 from contamination, restrain the loaded pigs 120 and protect any seal surfaces of the first end portion 138. Caps must be removed before connecting the first end portion 138 to the pipe 200.

The second end portion 139 of the cylinder 130 is adapted to be sealed off, at least during operation of the pig drive 110. The second end portion 139 may be permanently sealed off, but preferably comprises a cap or similar that can be removed to gain access to the cylinder 130. If the second end portion 139 comprises a cap, the cap must be adapted to seal off the second end portion 139 of the cylinder 130. When loading the cylinder 130 with the pigs 120 and the pig drive 110, access through the second end portion 139 of the cylinder 130 may be required if the first end portion 138 of the cylinder 130 is too narrow for the pig drive 110 to enter. Access to the cylinder 130 through both the first end portion 138 and the second end portion 139 may be beneficial for maintenance purposes.

The cylinder 130 must be able to withstand the applicable wellhead pressure, wellhead pressure is dependent on the reservoir pressure.

Typical applicable wellhead pressure is up to 13.8 MPa (2000 psi), 20.7 MPa (3000 psi), 34.5 MPa (5000 psi), 68.9 MPa (10000 psi), 103 MPa (15000 psi), 138 MPa (20000 psi), 207 MPa (30000 psi).

The applicable wellhead pressure may be in the range from 13.8 MPa (2000 psi) to 207 MPa (30000 psi).

The cylinder 130 further comprises a retainer abutment 132. The retainer abutment 132 illustrated in FIG. 3a is arranged in the first end portion 138 of the cylinder 130. The retainer abutment 132 is adapted to interface and restrain the retainer 113 of the pig drive 110. The retainer 113 and the retainer abutment 132 have mating geometry, preferable in the form of a coned angle. The retainer abutment 132 should be shaped so that the pig 120 is not obstructed by it and such that it does not impose unacceptable stress concentration loads on the cylinder. Typically, the slope of the retainer abutment is in the range of 1:6 to 1:3.

When loading the cylinder 130 through the second end portion 139, the required number of pigs 120 are loaded into the cylinder 130 prior to the pig drive 110. The pig drive 110 is arranged in the cylinder 130 with the piston 111 oriented towards the second end portion 139 and the retainer 113 oriented towards the first end portion 138. After the cylinder 130 has been loaded, the second end portion 139 of the cylinder 130 must be sealed off, such that a fluid pressure can build up in a chamber defined by the piston 111 of the pig drive 110 and an inside of the second end portion 139 of the cylinder 130.

To provide the chamber defined by the piston 111 of the pig drive 110 and an inside of the second end portion 139 of the cylinder 130, the cylinder 130 may comprise a distance piece 136.

By sufficiently pressurizing the chamber defined by the piston 111 of the pig drive 110 and an inside of the second end portion 139 of the cylinder 130, the pig drive 110 will start to travel towards the first end portion 138 of the cylinder 130. Pigs 120 will be pushed out of the first end portion 138 of the cylinder 130 in response to the pig drive 110 moving towards said first end portion 138. Pigs 120 pushed out of the first end portion 138 of the cylinder 130 will be fed into the connected pipe 200.

When the last pig 120 has been pushed out of the cylinder 130, the pig drive 110 will have reached the first end portion 138 of the cylinder 130. In the first end portion 138 of the cylinder 130, the retainer 113 of the pig drive 110 will come into contact with the retainer abutment 132. When the retainer 113 of the pig drive 110 comes into contact with the retainer abutment 132, the pig drive 110 will normally be in its retracted state as illustrated in FIG. 3a. Some of the impact forces caused by the retainer 113 contacting the retainer abutment 132 may be absorbed by the biasing device 114 of the pig drive 110.

When the pig drive 110 is in the retracted state and engaged with the retainer abutment 132, the rod 112 of the pig drive 110 should not extend outside the cylinder 130.

When the last pig 120 has been pushed out of the cylinder 130 and the pig drive 110 has engaged the retainer abutment 132, said last pig 120 may not have fully reached the kicker section of the pipe 200. The pig drive 110 is therefore adapted to extend out of the cylinder 130 and into the pipe 200 to make sure that the last pig 120 entering the pipe 200 also fully reach the kicker section of the pipe 200.

The pig drive 120 can be operated towards its extended state when arranged in the cylinder 130 and in contact with the retainer abutment 132 by means of pressurizing the compartment defined by the second end portion 139 of the cylinder 130 and the piston 111 of the pig drive 110. The force provided by the fluid pressure applied on the piston 111 must exceed the biasing force provided by the biasing device 114 for the pig drive 110 to be operated towards the extended state.

When the pig drive 110 is in the extended state and engaged with the retainer abutment 132, the rod 112 of the pig drive 110 should extend outside the cylinder 130 and at least a given length into the pipe 200 connected to the first end section 138 of the cylinder 130, as illustrated in FIG. 3b. Said length of the rod 112 should be sufficiently long to push the last pig 120 entering the pipe 200 into the kicker section of said pipe 200.

The pig drive 120 can be operated towards its retracted state when arranged in the cylinder 130 and in contact with the retainer abutment 132 by means of depressurizing the compartment defined by the second end portion 139 of the cylinder 130 and the piston 111 of the pig drive 110. The force provided by the fluid pressure applied on the piston 111 must be reduced below the biasing force provided by the biasing device 114 for the pig drive 110 to be operated towards the retracted state.

Figure 4A:
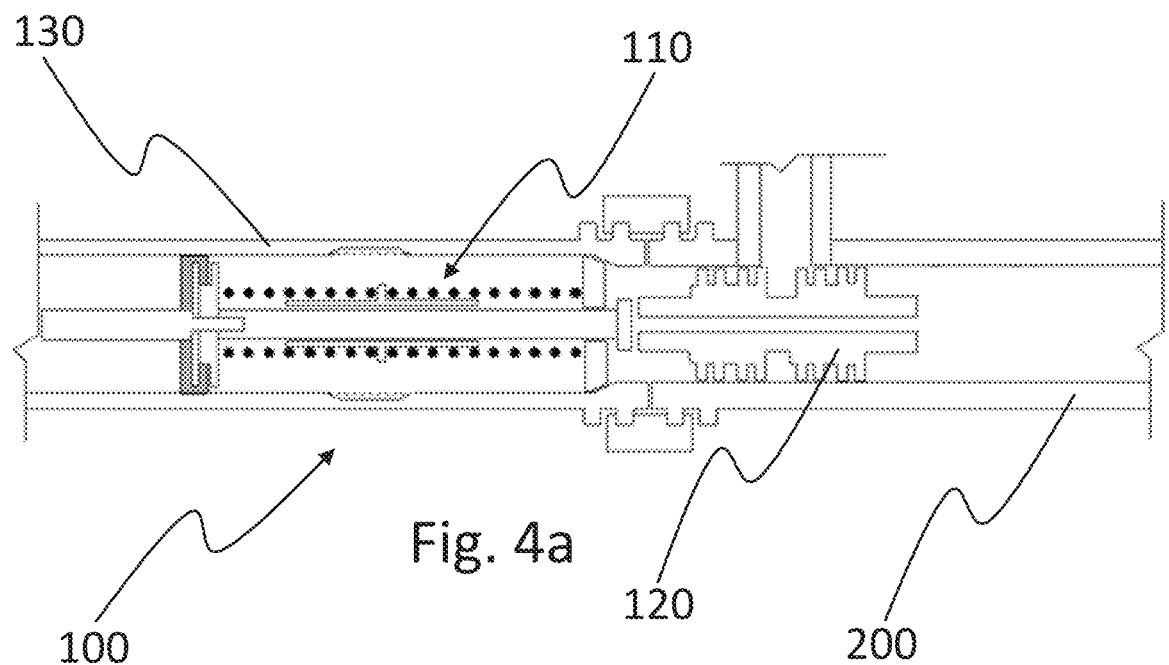
FIG. 4a shows a cross-section of a pig drive system for feeding a pig into a pig kicker section of a pipe according to an embodiment of the invention, wherein the cylinder has an internal groove.
Figure 4B:
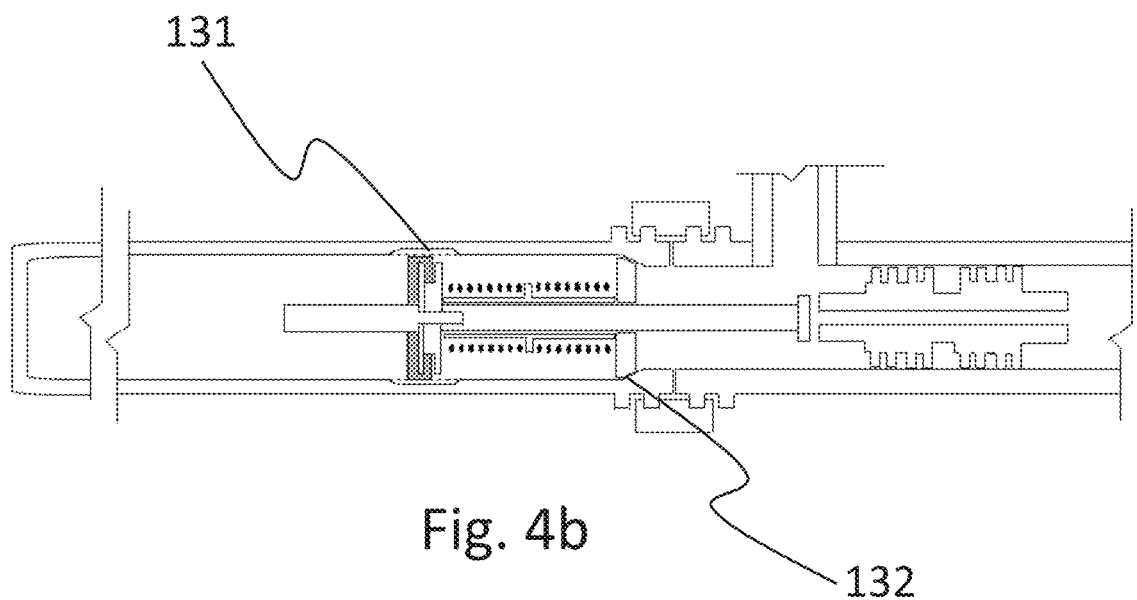
FIG. 4b shows a cross-section of a pig drive system for feeding a pig into a pig kicker section of a pipe according to an embodiment of the invention, wherein the cylinder has an internal groove and the internal groove equalizes a pressure across the piston.

FIGS. 4a and 4b show cross-sections of a pig drive system 100 like the pig drive system of FIGS. 3a and 3b. The pig drive system 100 of FIGS. 4a and 4b may comprise all the same features as the pig drive system of FIGS. 3a and 3b. An additional feature of the pig drive system 100 illustrated in FIGS. 4a and 4b is that the cylinder 130 comprises at least one internal groove 131. The at least one internal groove 131 is adapted for equalizing a fluid pressure across the piston 111. The depth of the internal groove 131 should not exceed a wall thickness of the cylinder 130.

In FIG. 4a the pig drive 110 is in the retracted state, and in FIG. 4b the pig drive 110 is operated towards the extended state.

The internal groove 131 extends in the axial direction of the cylinder 130. The extension of the internal groove 131 is greater than the axial extension of the piston 111. In this way a piston 111 will not be able to travel past the internal groove 131 because the fluid pressure moving it would be equalized when the piston 111 reaches a point where the internal groove 131 extends on both sides of the piston 111.

The internal groove 131 is arranged to allow the retainer 113 to contact the retainer abutment 132 while the pig drive 110 enters the extended state, or at least operates a given distance towards the extended state, before the piston 111 reaches the internal groove 131.

The internal groove 131 may extend the entire 360 degrees of the internal circumference of the cylinder 130. Alternatively, a plurality of internal grooves 131 may be distributed around the internal circumference of the cylinder 130. The at least one internal groove 131 not extending the entire internal circumference of the cylinder 130 may be arranged helically, straight-lined, etc.

Figure 5A:
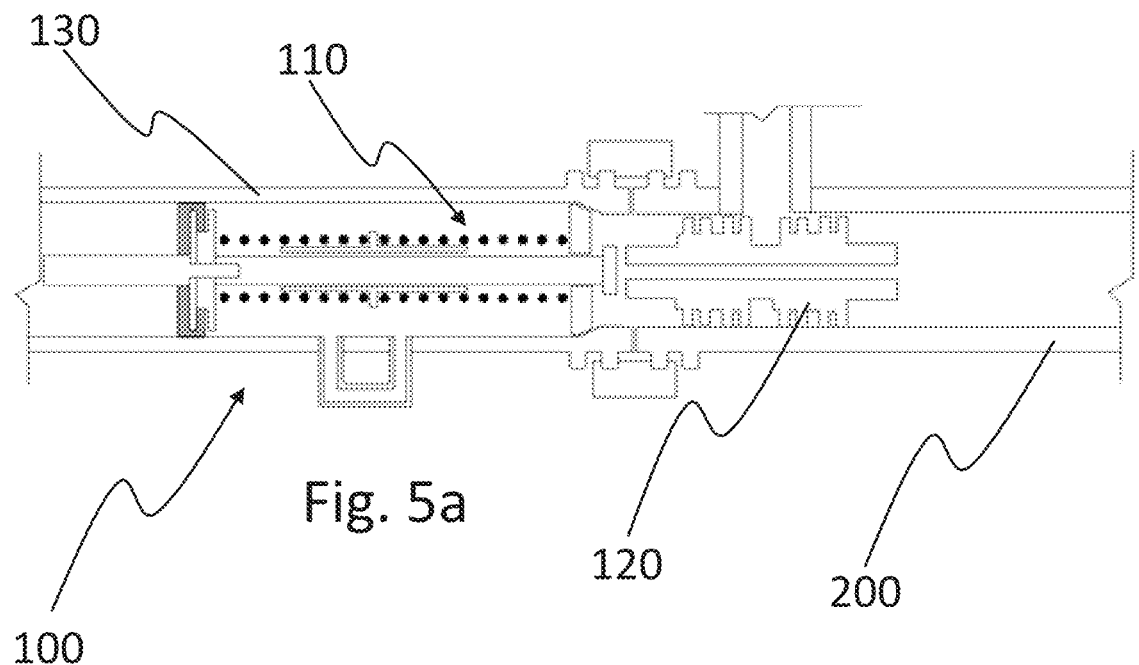
FIG. 5a shows a cross-section of a pig drive system for feeding a pig into a pig kicker section of a pipe according to an embodiment of the invention, wherein the cylinder has a by-pass conduit.
Figure 5B:
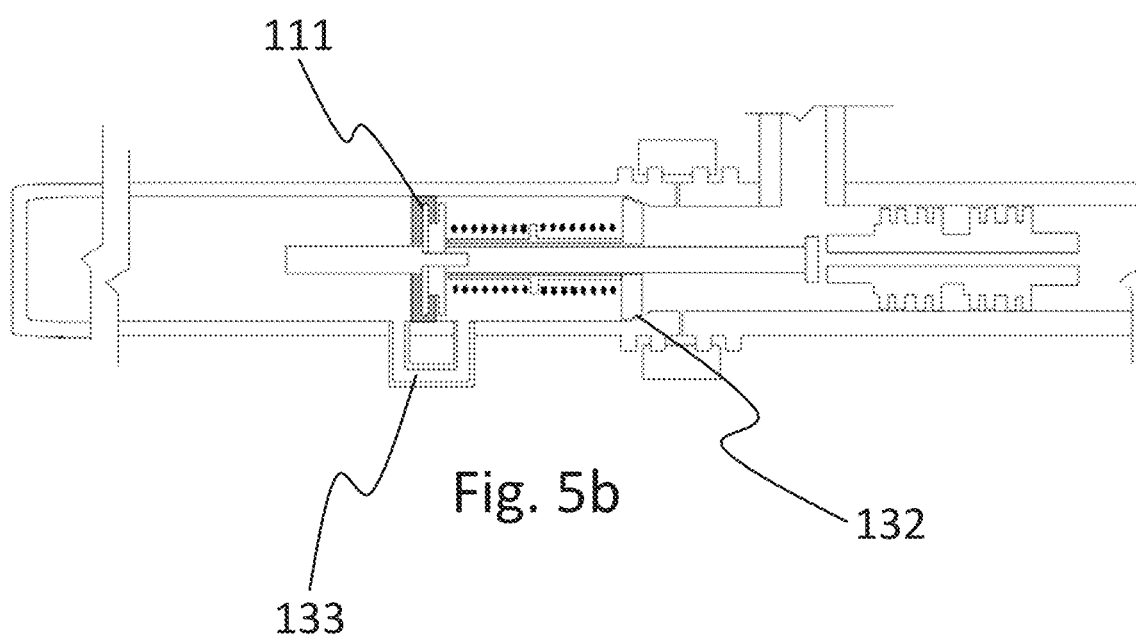
FIG. 5b shows a cross-section of a pig drive system for feeding a pig into a pig kicker section of a pipe according to an embodiment of the invention, wherein the cylinder has a by-pass conduit and the by-pass conduit equalizes a pressure across the piston.

FIG. 5a and FIG. 5b show cross-sections of a pig drive system 100 like the pig drive system of FIGS. 3a and 3b. The pig drive system 100 of FIGS. 5a and 5b may comprise all the same features as the pig drive system of FIGS. 3a and 3b. An additional feature of the pig drive system 100 illustrated in FIGS. 5a and 5b is that the cylinder 130 comprises at least one external by-pass conduit 133. The at least one by-pass conduit 133 is adapted for equalizing a fluid pressure across the piston 111.

In FIG. 5a the pig drive 110 is in the retracted state, and in FIG. 5b the pig drive 110 is operated towards the extended state.

The by-pass conduit 133 has at least two connection points with the cylinder 130 which are in fluid communication with the inside of the cylinder 130. The distance between the two connection points of the by-pass conduit 133 extends in the axial direction of the cylinder 130. Said extension is greater than the axial extension of the piston 111. In this way a piston 111 will not be able to travel past the by-pass conduit 133 because the fluid pressure moving it would be equalized when the piston 111 reaches a point where it has one connection point of the by-pass conduit 133 on each side.

The by-pass conduit 133 is arranged to allow the retainer 113 to contact the retainer abutment 132 while the pig drive 110 enters the extended state, or at least operates a given distance towards the extended state, before the piston 111 reaches the by-pass conduit 133.

The inner diameter of the by-pass conduit 133 may be selected independently of the cylinder 130 wall thickness. Hence, the inner diameter of the by-pass conduit 133 can be selected freely. By increasing the inner diameter of the by-pass conduit 133 the risk of clogging will be reduced.

Figure 6:
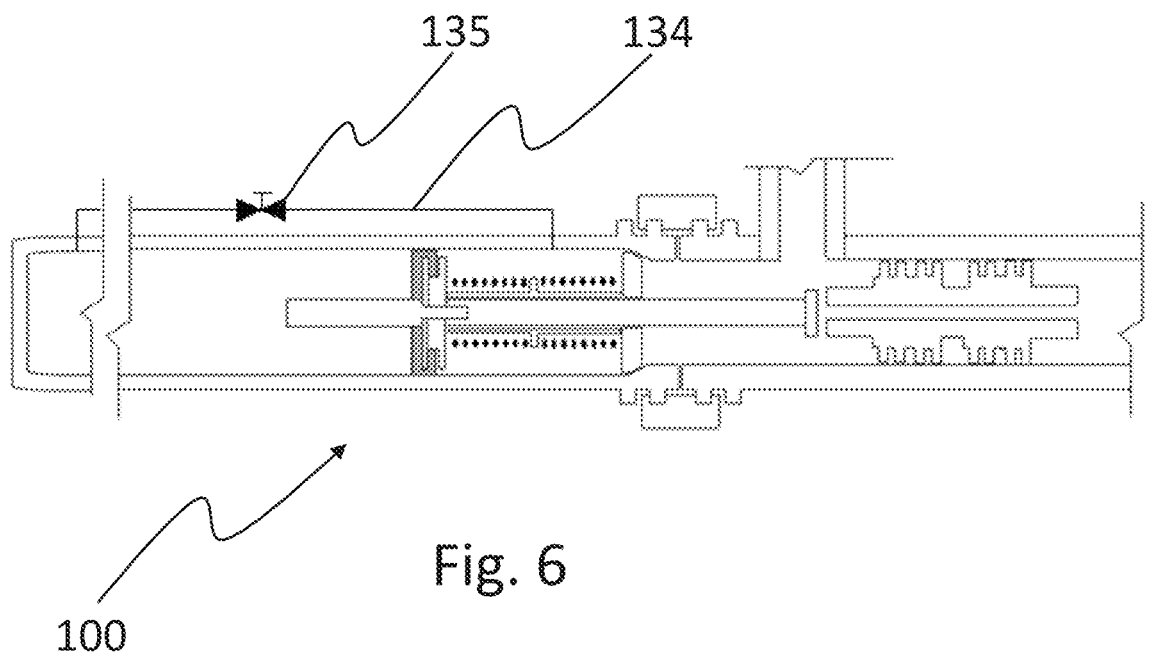
FIG. 6 shows a cross-section of a pig drive system for feeding a pig into a pig kicker section of a pipe according to different embodiments of the invention, wherein the cylinder has a distance piece.
Figure 8A:
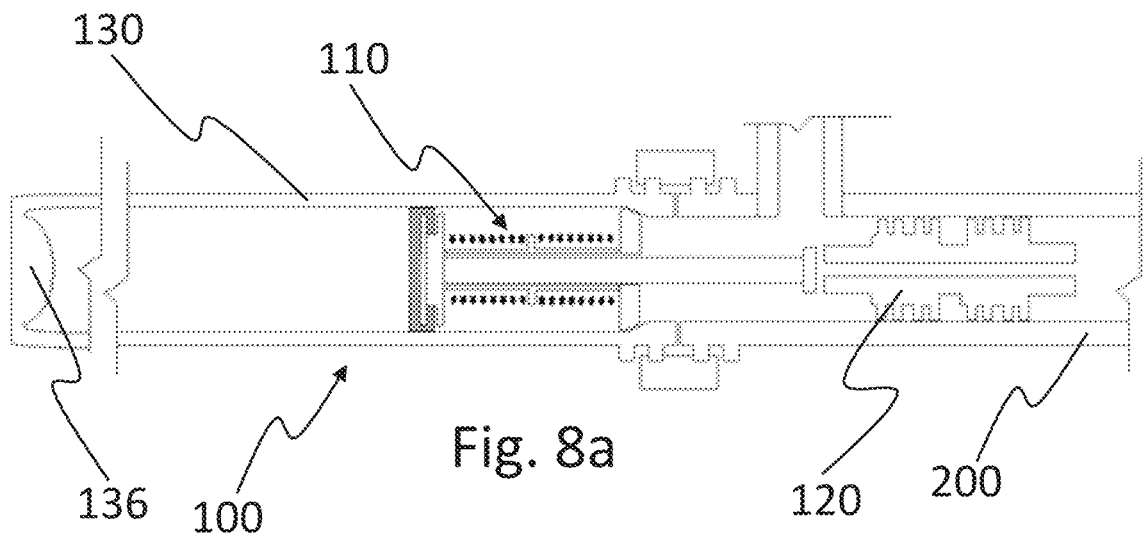
FIGS. 8a-8c show cross-sections of a pig drive system for feeding a pig into a pig kicker section of a pipe according to an embodiment of the invention, wherein the cylinder has a supply port.
Figure 8B:
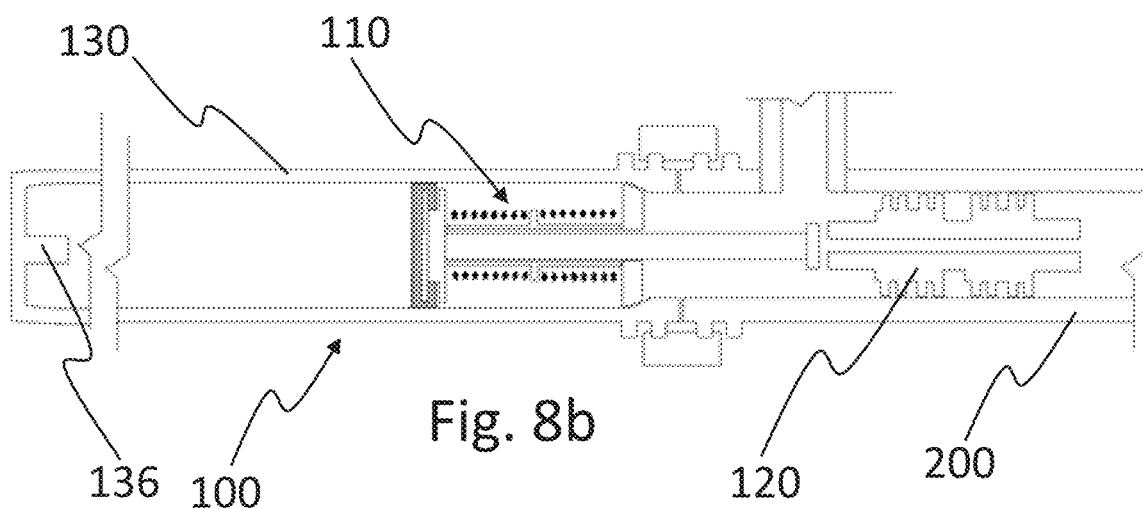
Figure 8C:
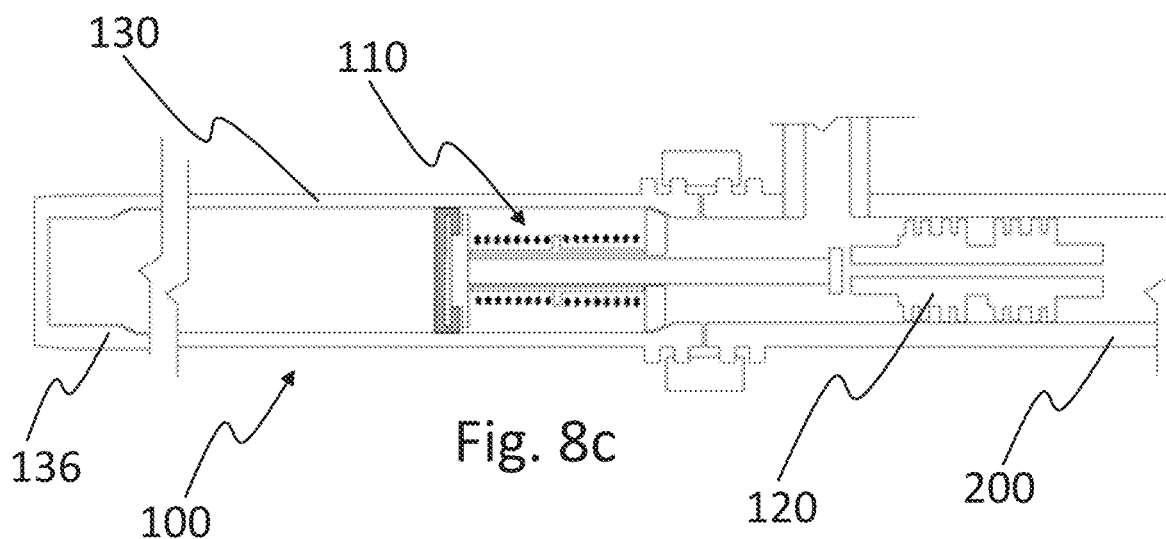

FIG. 6 shows a cross-section of a pig drive system 100 like the pig drive system of FIGS. 3a and 3b. The pig drive system 100 of FIG. 8a-c may comprise all the same features as the pig drive system of FIG. 3a-b, FIG. 4a-b and FIG. 5a-b. An additional feature of the pig drive system 100 illustrated in FIG. 8a-c is that the cylinder 130 comprises at least one operable conduit 134 provided with a valve 135.

The operable conduit 134 has at least two connection points with the cylinder 130 which are in fluid communication with the inside of the cylinder 130. A valve 135 is provided between said connection points to prevent or allow a fluid flow through the operable conduit 134. The operable conduit 134 comprising more than two connection points may also comprise more than one valve 135. The operable conduit 134 may e.g. comprise valves 135 between all adjacent connection points.

As illustrated in FIG. 6 one connection point of the operable conduit 134 may be arranged in the first end portion 138 of the cylinder 130. Preferably the one connection point is arranged such that it provides fluid communication to the volume defined by the piston 111, the retainer 113 and the first end portion 138 of the cylinder 130 when the retainer 113 is engaged with the retainer abutment 132 and the pig drive 110 has been operated towards the extended state.

As illustrated in FIG. 6 a second connection point of the operable conduit 134 may be arranged in the second end portion 138 of the cylinder 130. Preferably the second connection point is arranged such that it provides fluid communication to the volume defined by the piston 111, and the second end portion 138 of the cylinder 130 when the retainer 113 is engaged with the retainer abutment 132 and the pig drive 110 is in the retracted state.

The second connection point may alternatively be arranged in the cap connected to the second end portion 139 of the cylinder 130.

The operable conduit 134 may comprise a series of intermediate connection points arranged between the above-mentioned first and second connection points.

Figure 7:
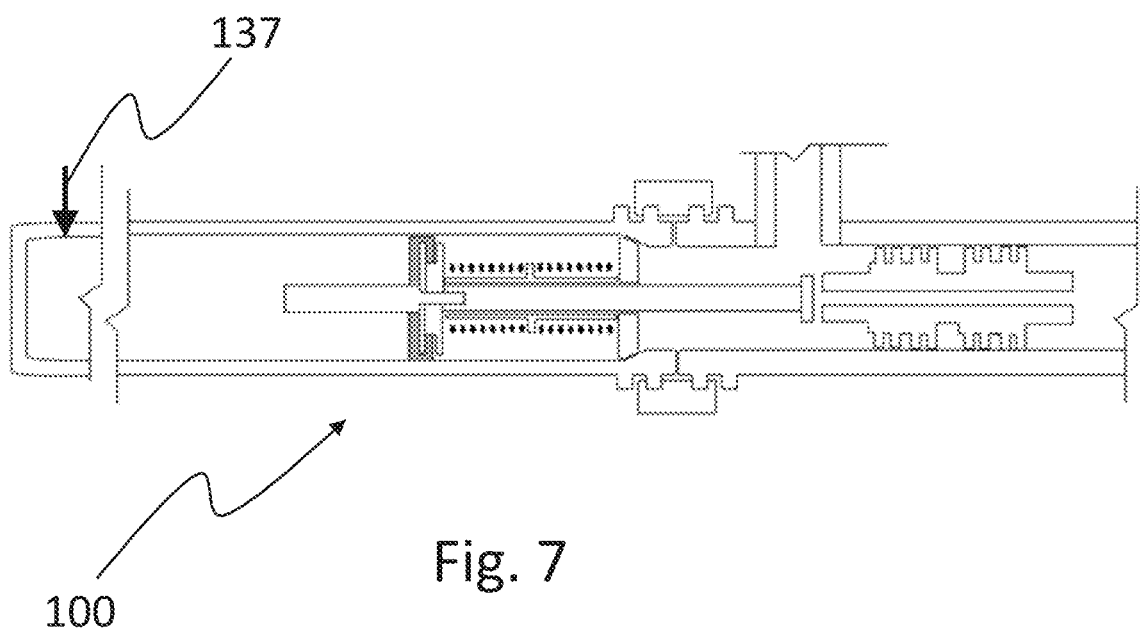
FIG. 7 shows a cross-section of a pig drive system for feeding a pig into a pig kicker section of a pipe according to an embodiment of the invention, wherein the cylinder has an operable conduit.

FIG. 7 shows a cross-section of a pig drive system 100 like the pig drive system of FIGS. 3a and 3b. The pig drive system 100 of FIG. 7 may comprise all the same features as the pig drive system of FIG. 3a-b, FIG. 4a-b, FIG. 5a-b and FIG. 6. An additional feature of the pig drive system 100 illustrated in FIG. 7 is that the cylinder 130 comprises at least one supply port 137 for supply of a fluid pressure into the volume defined between the second end portion 139 of the cylinder 130 and the piston 111.

The supply port 137 may comprise a hot stab receptacle or any type of fittings.

FIG. 8a, FIG. 8b and FIG. 8c show cross-sections of a pig drive system 100 like the pig drive system of FIGS. 3a and 3b. The pig drive system 100 of FIG. 8a-c may comprise all the same features as the pig drive system of FIG. 3a-b, FIG. 4a-b, FIG. 5a-b, FIG. 6 and FIG. 7. An additional feature of the pig drive system 100 illustrated in FIG. 8a-c is that the cylinder 130 comprises at least one distance piece 136. The at least one distance piece 136 is arranged to provide a volume defined between the piston 111 and a termination of the second end portion 139 of the cylinder 130.

If the supply port 137 or the operable conduit 134 is connected to the cylinder 130 wall of the second end portion 139, i.e. not in the cap connected to the second end portion 139, the volume provided by the distance piece 136 ensures fluid communication between said volume and the supply port 137 and/or the operable conduit 134. This fluid communication enables a fluid pressure to be applied in said volume and thus also on the piston 111.

The distance piece 136 may be any kind of protrusion arranged in the termination of the second end portion 139, e.g. a dome on the cap or a shoulder on the cylinder 130 wall.

In FIG. 8a the cylinder has a distance piece 136 in the form of a dome provided on the inside of the cap connected to the second end portion 139 of the cylinder 130.

In FIG. 8b the cylinder has a distance piece 136 in the form of a protrusion provided on the inside of the cap connected to the second end portion 139 of the cylinder 130.

In FIG. 8c the cylinder has a distance piece 136 in the form of a shoulder provided on the inside of the cylinder 130 wall in the second end portion 139 of the cylinder 130.

FIG. 9a, FIG. 9b and FIG. 9c show cross-sections of a pig drive system 100 like the pig drive system of FIGS. 3a and 3b. The pig drive system 100 of FIG. 9a-c may comprise all the same features as the pig drive system of FIG. 3a-b, FIG. 4a-b, FIG. 5a-b, FIG. 6, FIG. 7 and FIG. 8a-c.

In the pig drive system 100 illustrated in FIG. 9a-c, the cylinder 130 is loaded with a plurality of pigs 120 and a pig drive 110.

In FIG. 9a a first cap is arranged on the first end portion 138 of the cylinder 130 and a second cap is arranged on the second end portion 139 of the cylinder 130. The pigs 120 and the pig drive 110 may preferably be loaded into the cylinder 130 before installing said caps on the cylinder 130. The pig drive 110 is adapted to abutting a retainer abutment 132 in the cylinder 130, i.e. the pig drive 110 may not travel past this retainer abutment 132. When loading the pig drive 110 into the cylinder 130, the pig drive 110 must be loaded from the opposite side from the retainer abutment 132, e.g. from the second end portion 139 of the cylinder 130 when the retainer abutment 132 is arranged in the first end portion 138 of the cylinder 130.

The pig drive system 100 is ready for storage, transportation or deployment when all pigs 120 and the pig drive 110 are loaded into the cylinder 130 and the caps are installed, as illustrated in FIG. 9a.

In FIG. 9b the first cap is removed from the first end portion 138 of the cylinder 130. This cap must be removed before connecting the cylinder 130 to the pipe 200. The second cap may preferably stay arranged on the second end portion 139 of the cylinder 130 during installation.

In FIG. 9c the cylinder 130 is connected to the pipe 200. The first end portion 138 of the cylinder 130 is connected to the pipe 200 e.g. by means of a clamp connector.

The cylinder 130 may be provided with a structure for arranging and supporting the cylinder 130 during and after subsea installation. The structure of the cylinder 130 may be adapted to interface a structure arranged to the pipe 200, as illustrated in FIG. 9c.

REFERENCE LIST

100—Pig drive system
  110—Pig drive
    111—Piston
    112—Rod
    113—Retainer
    114—Biasing device
    115—Spacer
    116—Distance piece (of pig drive)
  120—Pig
  130—Cylinder
    131—Internal groove
    132—Retainer abutment
    133—By-pass conduit
    134—Operable conduit
    135—Valve
    136—Distance piece (of cylinder)
    137—Supply port
    138—First end portion
    139—Second end portion
200—Pipe

The invention claimed is:

1. A pig drive for feeding a pig into a pig kicker section of a pipe, the pig drive being configured to be introduced into a cylinder, the cylinder being adapted to house the pig drive and the pig, and the pig drive comprising:
  a piston with a radial direction and an axial direction;
  a rod connected to the piston and extending in the axial direction of the piston, wherein the rod has a distal end adapted to interface the pig;
  a retainer slidably connected to the rod, configured to move in the cylinder and adapted to interface a retainer abutment, wherein the retainer comprises at least one through hole for pressure equalization; and
  a biasing device arranged to bias the retainer towards the distal end of the rod.

2. The pig drive according to claim 1,
wherein the biasing device is a spring arranged around the rod.

3. The pig drive according to claim 2,
wherein the spring is arranged between the piston and the retainer.

4. The pig drive according to claim 1,
further comprising a spacer,
wherein the spacer is:
  arranged around the rod and between the piston and the retainer; and/or
  adapted to ensure a minimum distance between the piston and the retainer.

5. The pig drive according to claim 1,
wherein the distal end of the rod comprises a perpendicularly protruding portion adapted to limit a maximum distance between the piston and the retainer.

6. A pig drive system for feeding a pig into a pig kicker section of a pipe, the pig drive system comprising:
  the pig drive according to claim 1, wherein a translation of the retainer towards the distal end of the rod is adapted to operate the pig drive towards a retracted state; and wherein a translation of the retainer towards the piston is adapted to operate the pig drive towards an extended state;
the pig; and
a cylinder adapted to house the pig drive and the pig, wherein the cylinder surrounds the pig drive and the pig, and the cylinder comprises:
   i. a first end portion for sealing connection to the pig kicker section of the pipe;
   ii. a second end portion sealed during operation of the pig drive; and
   iii. the retainer abutment;
wherein the retainer is configured to move between the first end portion of the cylinder and a second end portion of the cylinder along a longitudinal axis of the cylinder, and the retainer comprises the at least one through hole for pressure equalization;
wherein the rod is arranged to extend outside the first end portion of the cylinder when the pig drive is in the extended state and the retainer is in contact with the retainer abutment; and
wherein the rod is arranged to be within the cylinder when the pig drive is in the retracted state and the retainer is in contact with the retainer abutment.

7. The pig drive system according to claim 6,
wherein the cylinder has an axial direction and a radial direction, and comprises at least one internal groove for equalizing a pressure across the piston; and
wherein the at least one internal groove:
   extends along an axial length of the cylinder which is greater than an axial extension of the piston; and
   is arranged to allow the retainer to contact the retainer abutment and the pig drive to enter the extended state.

8. The pig drive system according to claim 6,
wherein the cylinder has an axial direction and a radial direction, and comprises at least one by-pass conduit for equalizing a pressure across the piston; and
wherein the at least one by-pass conduit:
   comprises a first end and a second end, the first end and the second end being connected to and in fluid communication with the cylinder;
   is arranged with the first end at a position which the piston will pass during operation of the pig drive towards the extended state if the retainer is in contact with the retainer abutment; and
   is arranged with the second end at a position spaced apart at a spacing from the first end in an axial direction towards the first end portion of the cylinder, wherein the spacing is greater than an axial extension of the piston.

9. The pig drive system according to claim 6,
further comprising:
   an operable conduit comprising a first end connected to and in fluid communication with the first end portion of the cylinder and a second end connected to and in fluid communication with the second end portion of the cylinder; and
   a valve arranged in the operable conduit, for control of equalization of a fluid pressure across the piston;
wherein the pig drive is arranged so as to be closer to the second end portion of the cylinder than the pig, and with the retainer facing the retainer abutment.

10. The pig drive system according to claim 6,
further comprising:
   a distance piece arranged to provide a volume between the piston and a termination of the second end portion of the cylinder.

11. The pig drive system according to claim 6,
wherein the cylinder further comprises:
   a supply port arranged in the second end portion of the cylinder, for supply of a fluid pressure on the piston.

12. A method of feeding a pig into a pig kicker section of a pipe using the pig drive system according to claim 11,
the method comprising:
   arranging the pig drive and the pig inside the cylinder;
   connecting the first end portion of the cylinder to the pig kicker section of the pipe;
   connecting the supply of the fluid pressure to the supply port; and
   moving the pig drive towards the pig kicker section of the pipe by applying the fluid pressure on the piston, such that movement of the pig drive causes the pig to move into the pig kicker section of the pipe.

13. The method according to claim 12,
further comprising:
   moving the pig drive until the retainer meets the retainer abutment;
   operating the pig drive into the extended state by applying the fluid pressure on the piston, allowing the rod to extend into the pig kicker section of the pipe;
   operating the pig drive into the retracted state by reducing the fluid pressure on the piston, allowing the rod to retract from the pig kicker section of the pipe;
   disconnecting the supply of the fluid pressure from the supply port; and
   disconnecting and recovering the pig drive system.

* * * * *